(12) United States Patent
Chen

(10) Patent No.: US 6,923,638 B2
(45) Date of Patent: Aug. 2, 2005

(54) APPARATUS FOR OBTAINING BALANCED FLOW OF HOT MELT IN A DISTRIBUTION MANIFOLD

(75) Inventor: Jincheng Chen, Lee's Summit, MO (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 0 days.

(21) Appl. No.: 10/336,164

(22) Filed: Jan. 3, 2003

(65) Prior Publication Data

US 2004/0130071 A1 Jul. 8, 2004

(51) Int. Cl.⁷ .............................................. B29C 45/23
(52) U.S. Cl. ................................... 425/564; 264/328.8
(58) Field of Search ................................ 425/572, 564; 264/328.8, 328.1

(56) References Cited

U.S. PATENT DOCUMENTS

| | | | |
|---|---|---|---|
| 3,491,408 A | * | 1/1970 | Natkins ....................... 425/564 |
| 3,535,742 A | * | 10/1970 | Marcus ........................ 425/564 |
| 4,620,958 A | | 11/1986 | Wiechard |
| 4,648,546 A | | 3/1987 | Gellert |
| 4,688,622 A | | 8/1987 | Gellert |
| 4,761,343 A | | 8/1988 | Gellert |
| 5,762,976 A | | 6/1998 | Brown |
| 5,871,786 A | * | 2/1999 | Hume et al. ................. 425/564 |

* cited by examiner

*Primary Examiner*—Tim Heitbrink
(74) *Attorney, Agent, or Firm*—Hovey Williams LLP

(57) ABSTRACT

An injection manifold has a main runner provided with a supply inlet intermediate opposite ends of the runner. A number of branches intersect with the runner along its length so as to be disposed at unequal distances from the inlet. In order to achieve more simultaneous delivery, uniform fill rate, and identity of temperature of hot melt across all cavities of a multi-cavity set to achieve more uniform cooling of the preforms, restrictor pin assemblies are provided in association with certain of the branches to adjustably constrict the space available for melt flow from the runner into the branch. In a preferred form each restrictor pin assembly includes a pin aligned axially with the branch and passing transversely through the runner, the pin being adjustable between a fully extended, maximum constriction position in which the tip of the pin is located within the branch and a fully retracted, open position in which the tip is withdrawn out of the branch and is spaced below the opening of the branch.

11 Claims, 3 Drawing Sheets

US 6,923,638 B2

APPARATUS FOR OBTAINING BALANCED FLOW OF HOT MELT IN A DISTRIBUTION MANIFOLD

TECHNICAL FIELD

This invention relates to improvements in the technology of making high quality preforms or parisons as part of an injection stretch blow mold (ISBM) or injection blow mold (IBM) process leading to the production of high quality finished PET bottle products. More particularly, it relates to distributing hot melt through a manifold in such a way that the melt reaches all injection cavities of a set thereof at more exactly the same time, rate, and temperature than in the past, resulting in preforms or parisons that cool more uniformly across all of the cavities and, consequently, produce finished bottles of more consistently high quality.

BACKGROUND AND SUMMARY

Whether the bottle-making process is an ISBM process where the injected preliminary products are typically referred to as "preforms" or an IBM process where the injected products are typically called "parisons", the hot melt begins to cool the instant it enters an injection cavity because such cavities are relatively much colder than the distribution manifolds and injection nozzles through which the melt travels on its way to the injection cavities. (For the sake of simplicity, the term "preform" will hereinafter be used to refer collectively to both preforms and parisons, with the understanding that either or both an ISBM and an IBM process are contemplated.) Thus, if melt enters some of the cavities of a set of multiple cavities at a slightly different time than others and/or at a different rate, the melt in some cavities will cool at different rates than others, and some will not have as much time to cool down as others before the preforms are pulled out of the injection mold for the next stage in the process. This can have very significant consequences in the quality and consistency of the finished bottle products.

These variations in melt delivery time and fill rate are due in part to the nature and construction of conventional manifold systems. In conventional manifolds hot melt typically flows along a main runner into multiple branch passages that lead to the injection cavities. Passages that are more remote than others from the main inlet to the runner do not receive their melt at the same time as others, and their rates of fill are slower. While it is known in the art to attempt to deal with this imbalance problem by making the passages leading to the cavities different diameters, depending upon their distance from the main inlet, this practice significantly complicates manufacture of the tooling and can lead to time-consuming and costly trial-and-error efforts to achieve just the right set of dimensions for the tooling.

The present invention addresses these problems by providing adjustable restrictor devices in operable association with at least some of the branch passages in a distribution manifold so that the time of delivery of the hot melt into all of the injection cavities in the set can be synchronized and the rate of fill can be rendered essentially uniform across all of cavities of the set. In a preferred embodiment, all of the branch passages can be of the same diameter, and all of the nozzle tips and nozzle passages can likewise be of uniform diameter from one nozzle to another so as to simplify manufacture. Furthermore, in a preferred embodiment the restrictors are in the nature of pins that are aligned axially with the branch passages at their intersections with the main runner and which can be axially adjusted to move into and out of the branch passage to achieve the desired degree of constriction. Outermost branches that are most remote from the inlet to the main runner may be devoid of such restrictor pins, while those branches closer to the inlet may be provided with pins to the extent necessary. Preferably, adjustment is carried out by threading the pins into and out of the body of the manifold to the extent desired.

DETAILED DESCRIPTION

Figure 1:
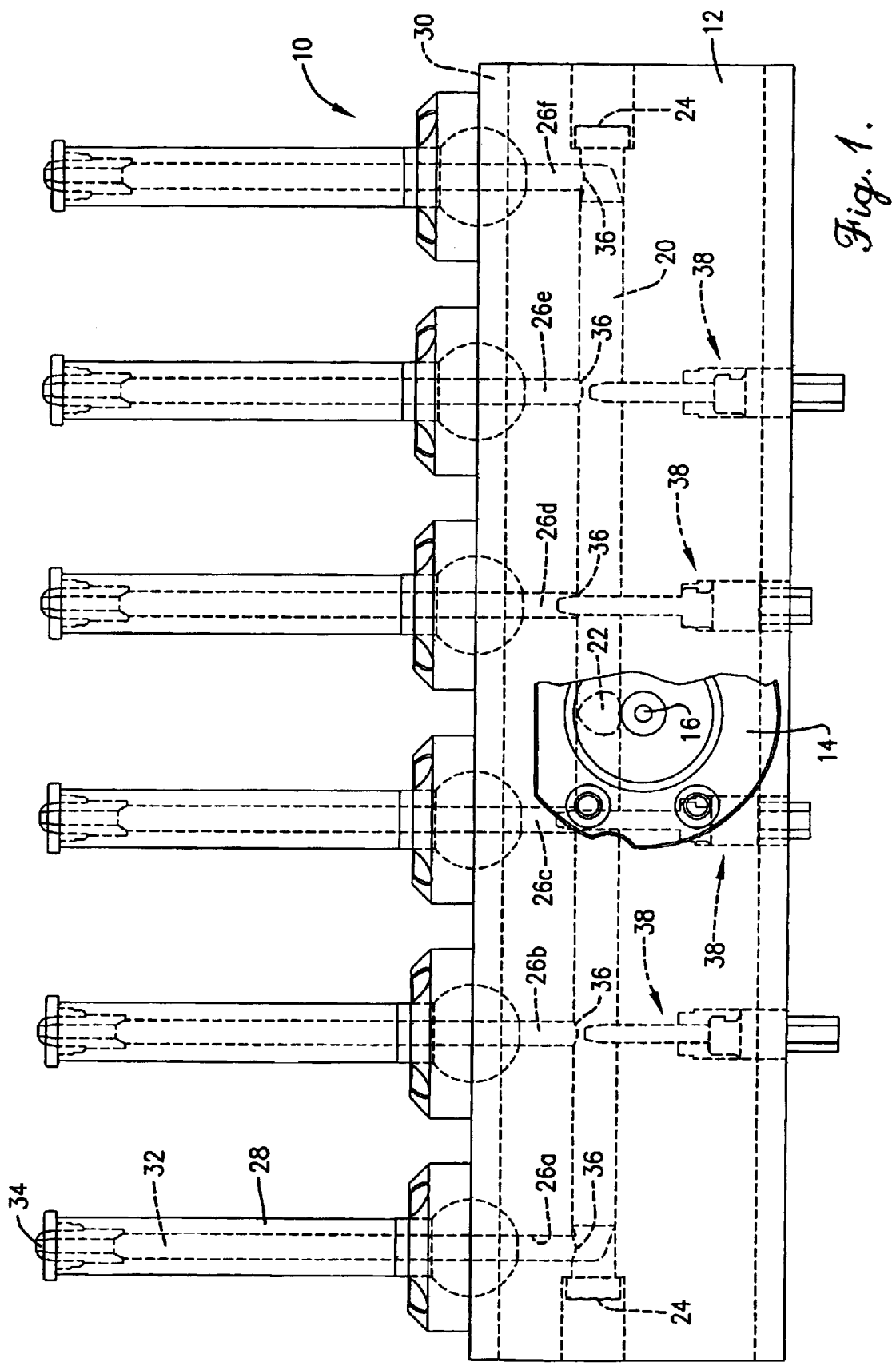
FIG. 1 is a front elevational view of a distribution manifold constructed in accordance with the principles of the present invention and capable of carrying out the novel method.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The manifold 10 comprises a solid parallelepiped body 12 constructed of material having good heat transfer properties such as 4140 high carbon alloy steel. A sprue bushing 14 on the front side of body 12 is adapted to be connected with an extruder (not shown) or other suitable source of supply of molten plastic material. Sprue bushing 14 has an internal passage 16 that communicates with and supplies melt to a slightly upwardly inclined central supply passage 18 within body 12. Passage 18 in turn intersects with a main, longitudinally extending runner 20 to form an inlet 22. Runner 20 extends the full length of body 12 and is closed at its opposite ends by a pair of suitable plugs 24. Suitable set screws (not shown) may be used to retain plugs 24 in place.

Main runner 20, in turn, communicates with and delivers melt into a plurality of branches 26 that intersect runner 20 at right angles at a plurality of locations along its length. Each branch 26 supplies melt to a corresponding injection nozzle assembly 28 that is adapted to deliver hot melt into a mold cavity as well understood by those skilled in the art. Each nozzle assembly 28 may, for example, take the form of the nozzle assemblies disclosed and claimed in co-pending application Ser. No. 10/272,974 filed Oct. 16, 2002 in the name of Brian R. Lefebure and titled "Injection Molding Nozzle." Accordingly, said application is hereby incorporated by reference into the present specification.

Figure 3:
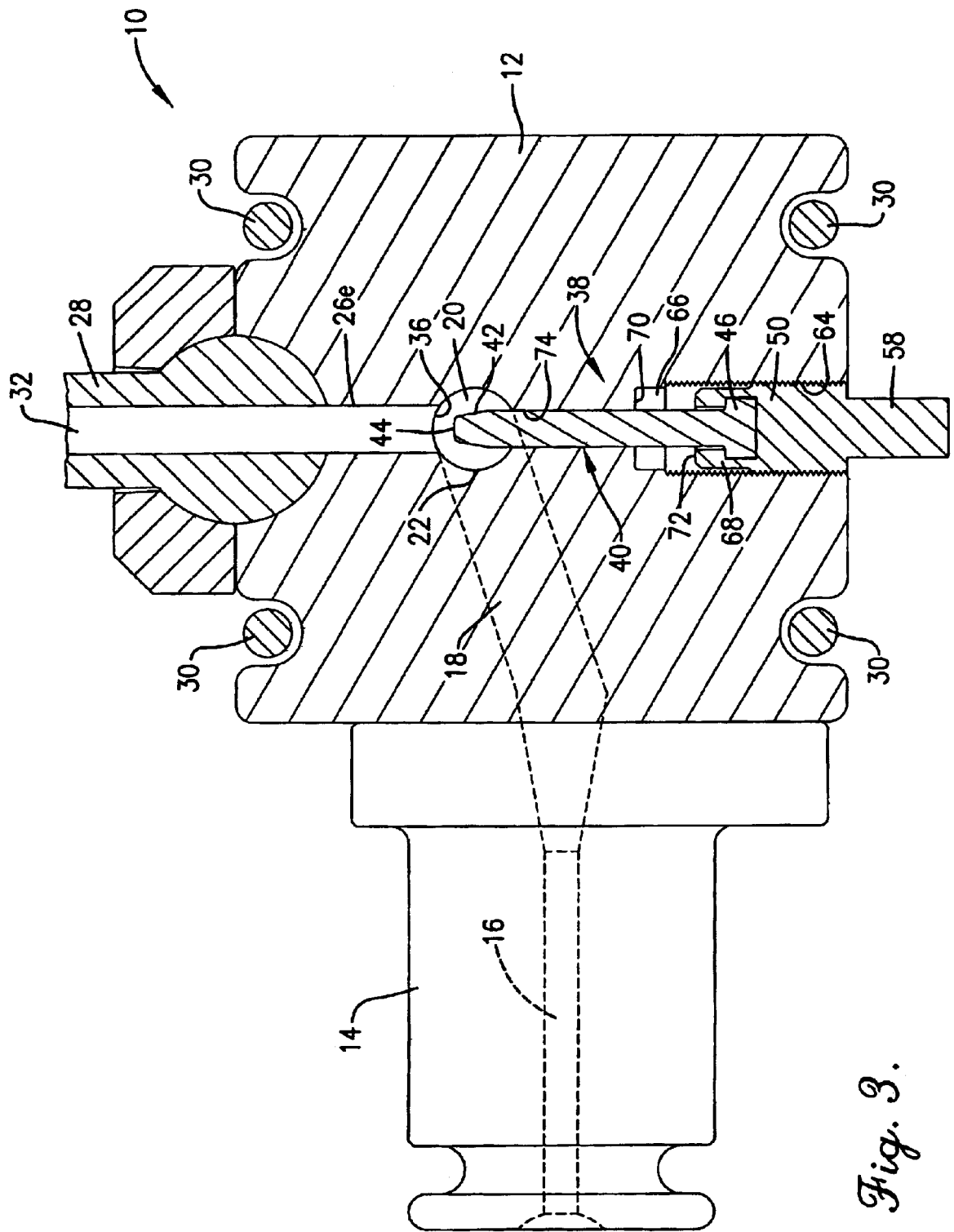
FIG. 3 is a fragmentary, transverse cross-sectional view through the manifold taken substantially along line 3—3 of FIG. 2.

In the illustrated embodiment, manifold body 12 is heated by four longitudinally extending heating elements 30 located generally at the respective four corners of the body 12 as illustrated in FIG. 3. It will be apparent that other means of heating manifold body 12 may be utilized without departing from the principles of the present invention. For example, auxiliary heaters and other techniques for maintaining a uniform temperature throughout manifold body may be utilized, such as those disclosed in co-pending application Ser. No. 10/336,168 filed contemporaneously herewith in the name of Jincheng Chen, et al. and titled "Injection Molding Distribution Manifold Having Improved Uniformity of Manifold Block Temperatures."

In the illustrated embodiment, an equal number of nozzle assemblies 28 and branches 26 are disposed on opposite sides of inlet 22, although this may vary. For convenience, the six branches 26 leading to the six nozzle assemblies 28 have been labeled as branches 26a–f starting with the leftmost branch in FIG. 1 and ending with the rightmost branch. The two outboard branches 26a and 26f are each spaced the same distance from inlet 22, while branches 26b and 26e are equally spaced from inlet 22, and the most inboard branches 26c and 26d are spaced from inlet 22 by an equal distance. In a preferred embodiment, all of the branches 26a–f are of the same diameter, and all of the nozzle assemblies 28 have their internal passages 32 of the same diameter, as well as the diameter of their outlet orifices 34.

Figure 4:
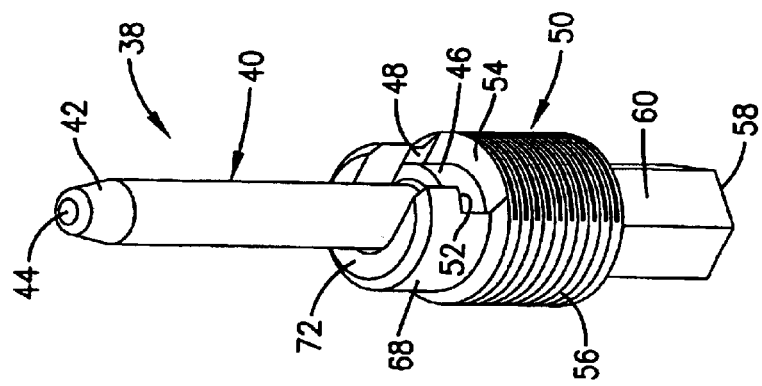
FIG. 4 is an enlarged isometric view of a restrictor pin assembly in accordance with the present invention.
Figure 2:
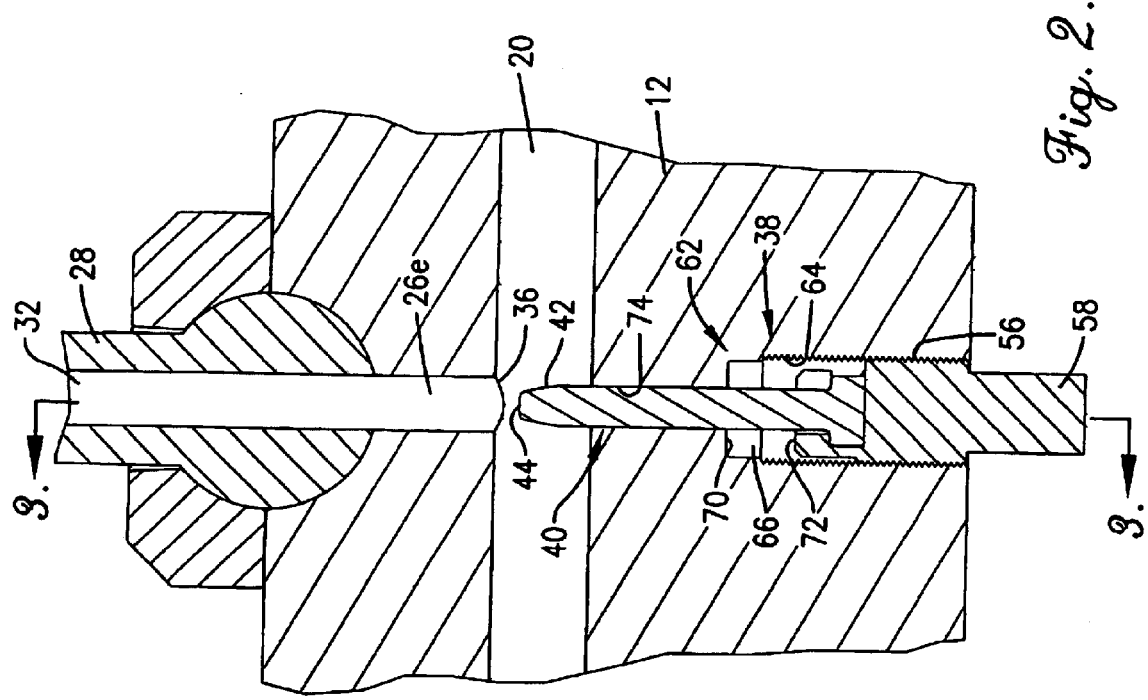
FIG. 2 is an enlarged, fragmentary vertical cross-sectional view through the manifold showing details of construction.

Each of the branches 26a–f intersects with the main runner 20 to present an opening 36 into the branch. At certain of these intersections, preferably those associated with the more inboard branches 26b–e, restrictor devices 38 are provided for cooperating with the openings 36 to control the dimensions of the space available for hot melt to flow from main runner 20 into the corresponding branch. As illustrated particularly in FIG. 4, each restrictor device 38 is in the nature of a pin assembly that includes an elongated pin 40 having a tapered tip 42 that is provided with a rounded extremity 44. At its opposite end, pin 40 is provided with an enlarged, cylindrical base 46 that is snugly yet slidably received within a transverse slot 48 on the upper end of a generally cylindrical holder 50. Slot 48 is undercut within the upper end of holder 50 so as to present an overhanging retaining ledge 52 that cooperates with an opposed floor 54 of slot 48 to prevent axial movement of pin 40 relative to holder 50. The exterior of the central portion of holder 50 is externally threaded to present a series of threads 56, while the lowermost portion of holder 50 comprises a knob 58 having a series of wrench flats 60 about its exterior to facilitate manipulation. In a preferred embodiment pin 40 is constructed from H13 tool steel and holder 50 is constructed from P20 steel.

The manifold body 12 is provided with a number of threaded bores entering from the bottom thereof, in the preferred embodiment there being a total of four of such bores. All of the bores are denoted by the numeral 62 and are adapted to threadably receive a corresponding one of the restrictor pin assemblies 38. Each bore 62 is aligned axially with a corresponding one of the branches 26b–e so as to be directly beneath the same. Further, each bore 62 includes an enlarged, threaded portion 64 adapted to threadably receive and mesh with threaded portion 56 of holder 50. A reduced diameter, upper portion 66 at the innermost end of threaded portion 64 is devoid of threads and is adapted to receive a correspondingly reduced diameter portion 68 of holder 50 when restrictor pin assembly 38 is fully threaded into bore 62. The innermost end 70 of unthreaded bore portion 66 serves as a limit stop to abut the opposed innermost end 72 of reduced diameter portion 68 of holder 50 when restrictor pin assembly 38 is fully screwed into bore 62. An axially extending hole 74 leads from end 70 of reduced diameter bore portion 66 and passes upwardly through body 12 until intersecting with runner 20 directly below the corresponding branch 26. Pin 40 of restrictor pin assembly 38 is slidably received within hole 74 and projects therefrom into runner 20 directly below the corresponding branch 26. Hole 74 is only slightly larger in diameter than pin 40 so that although pin 40 is movable axially within hole 74 for adjustment purposes, there is no opportunity for leakage from runner 20 around pin 40 and into hole 74 during operation.

Each of the restrictor pin assemblies 38, when fully screwed in so that end 72 of holder 50 abuts end 70 of reduced bore portion 66, is designed such that pin 40 projects upwardly through opening 36 and into the corresponding branch 26 for a short distance as illustrated by branches 26c and 26d in FIG. 1. Pin assemblies 38 for these two branches are thus in their fully restricted positions, in which condition the space for melt flow around pin 40, through opening 36 and into branch 26 is significantly limited.

Due to the lengthy threaded dimension of each enlarged threaded portion 64 of each bore 62, the restrictor pin assemblies 38 can be backed away from such fully restricted position to any number of more open positions as may be necessary or desirable for the situation at hand. One such open position is illustrated by pin assemblies 38 associated with branches 26b and 26e wherein tip 44 fully clears opening 36 so that the full diameter of branch 26 is available at opening 36 for melt flow. It will be appreciated, however, that pins 40 can be backed away even further than illustrated and, of course, can be positioned at any one of a number of intermediate positions between the retracted positions for branches 26b and 26e and the fully restricted positions for branches 26c and 26d.

Using restrictor pin assemblies 38, there is no need to vary the dimensions of certain branches 26. Likewise, the passages 32 of nozzles 28 can all be of the same diameter, as can the diameters of outlet orifices 34. Instead of varying the sizes of the passages in an effort to achieve balanced flow, the space for melt flow at critical locations is simply adjusted to the extent necessary. Once the desired degree of simultaneous melt delivery and fill rate is achieved, the pins 40 can be fixed in their selected positions by appropriate means not shown. In the end, more uniform dimensional characteristics of the preforms across all cavities of a set can be achieved, due to more uniform temperature and cooling of the preforms during and after the injection cycle, which results in higher quality finished bottle products.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A hot melt distribution manifold comprising:

a body;

a main runner in the body having an inlet for receiving hot melt from a source of supply;

a plurality of branches in the body having intersections with the main runner at spaced locations along its length so that at least certain intersections are farther away from the inlet than others;

a plurality of nozzle assemblies on the body communicating with the branches; and selectively adjustable restrictor devices operably associated with a plurality of said branches for adjustably constricting the space available for melt flow, the entirety of each of said restrictor devices being located upstream from the corresponding nozzle assembly in spaced relation thereto, each of said restrictor devices being devoid of structure projecting from the restrictor device into the corresponding nozzle assembly.

2. A distribution manifold as claimed in claim 1, all of said branches being of substantially the same diameter.

3. A hot melt distribution manifold comprising:

a body;

a main runner in the body having an inlet for receiving hot melt from a source of supply;

a plurality of branches in the body having intersections with the main runner at spaced locations along its length so that at least certain intersections are farther away from the inlet than others; and selectively adjustable restrictor devices operably associated with a plurality of said branches for adjustably constricting the space available for melt flow, all of said branches being of substantially the same diameter, said branches including a pair of outboard branches that are equidistant from the inlet, and at least one additional pair of inboard branches that are equidistant from the inlet but are closer to the inlet than the outboard branches, said inboard brax ches having restrictor devices, said outboard branches being devoid of restrictor devices.

4. A distribution manifold as claimed in claim 3, said restrictor devices being located at said intersections.

5. A distribution manifold as claimed in claim 1, said restrictor devices being located at said intersections.

6. A distribution manifold as claimed in claim 1, each of said branches intersecting said main runner at right angles thereto, each of said restrictor devices including a pin passing transversely through the main runner and projecting axially of the corresponding branch.

7. A distribution manifold as claimed in claim 6, each intersection between a branch and said main runner including an opening, said pin having a tip, said pin being axially adjustable between a fully open position in which the tip is disposed on the upstream side of the opening and a fully restricted position in which the tip projects through said opening and into the branch.

8. A distribution manifold as claimed in claim 7, each pin being threadably adjustably engaged with the body.

9. A distribution manifold as claimed in claim 6, said pin having a tapered tip.

10. A distribution manifold as claimed in claim 9, said tip having a rounded outermost end.

11. A distribution manifold as claimed in claim 1, each restrictor being threadably adjustably engaged with the body.

* * * * *